Patented Aug. 22, 1950

2,519,691

UNITED STATES PATENT OFFICE 2,519,691

CHLORINATED HYDROCARBON

Martin B. Neuworth, Woodbury, N. J., assignor, by mesne assignments, to Socony-Vacuum Oil Company, Incorporated, New York, N. Y., a corporation of New York No Drawing. Application January 31, 1947, Serial No. 725,727

9 Claims. (Cl. 260—652)

This invention relates to a novel chlorinated hydrocarbon and relates more particularly to a novel polychlorinated alkane and its method of production.

The novel polychlorinated alkane of the present invention is 1,1,1,6,6,6-hexachlorohexane, the structural formula of which is

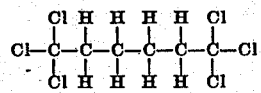

The polychlorinated alkane is prepared by condensation of two molecules of 1,1,1,3-tetrachloropropane in the presence of a catalyst comprising a chlorine acceptor which may be a heavy metal such as iron, copper, aluminum, etc. The reaction mechanism may be illustrated as follows:

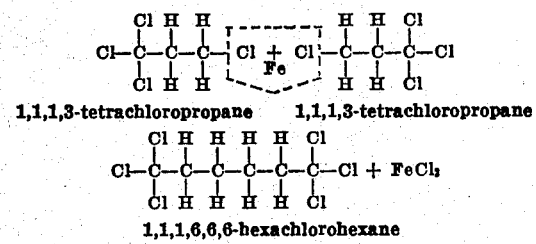

1,1,1,3-tetrachloropropane   1,1,1,3-tetrachloropropane 1,1,1,6,6,6-hexachlorohexane The starting material for the production of the product of the invention, namely, the 1,1,1,3-tetrachloropropane, may be prepared by reacting carbon tetrachloride with ethylene in the presence of a catalytic agent comprising an unstable organic compound which decomposes thermally to produce free radicals, a catalytic agent comprising an oxidizing agent which will, upon reaction with the ethylene, produce a compound in situ thermally decomposing to produce free radicals or a catalytic agent which will produce free radicals in situ by reaction with the carbon tetrachloride. Catalysts which decompose thermally to produce free radicals include hydrogen peroxide, benzoyl peroxide, unstable aromatic substituted azo compounds such as phenyl azo triphenylmethane, aliphatic azo compounds such as azomethane, etc. Catalysts which react with the ethylene to produce compounds thermally decomposing to produce free radicals include oxygen, nitric acid, etc., and catalysts which react with the carbon tetrachloride to produce free radicals in situ include alkali metal vapors or highly dispersed alkali metal melts. Temperatures of condensation may be between 50° to 400° C., although the most efficient temperature to be employed will depend largely upon the particular catalyst utilized.

In carrying out the condensation of two molecules of 1,1,1,3-tetrachloropropane to produce the 1,1,1,6,6,6-hexachlorohexane, the temperature of condensation to be employed may be between 100° C. and 150° C. Reaction times at temperatures of 100° C. may be of the order of 24 hours. However, with increase of temperature above 100° C., the reaction time may be decreased accordingly. Thus, at 150° C., a reaction time of one hour will be satisfactory.

The condensation reaction is preferably carried out in the presence of water. During the reaction, the surface of the chlorine acceptor becomes coated with the corresponding chloride and the water serves to dissolve this metallic chloride coating and thereby expose fresh surface for further chlorine acceptance. The amount of water required is not critical but should be sufficient to maintain a fresh surface on the chlorine acceptor.

The chlorine acceptor may be employed in stoichiometric amounts, but larger amounts may also be employed. The amount to be employed may, if desired, be as much as 30% in excess of the stoichiometric amount although any amount in excess of the stoichiometric amount will be satisfactory.

The following example will illustrate one method of preparation.

Thirty milliliters of 1,1,1,3-tetrachloropropane was heated at 100° C. for 28 hours with 150 milliliters of water and 25 grams of iron powder in a three-neck flask equipped with a stirrer and a condenser. At the end of this time, the reaction mixture was extracted with di-ethyl ether to remove the desired product after which the solution was stripped free of ether. After the residue cooled, colorless needles of 1,1,1,6,6,6-hexachlorohexane precipitated from the oil. These were filtered off and twice recrystallized from 95% ethanol. The final product was obtained in a yield of 20% by weight of the original 1,1,1,3-tetrachloropropane and had a melting point of 108–109° C. The results of analysis of the final product, as compared with the theoretical analysis, were as follows:

| | Carbon | Hydrogen | Chlorine | Molecular Weight |
|---|---|---|---|---|
| | Per cent | Per cent | Per cent | |
| Found | 24.86 | 2.71 | 72.36 | 270 |
| Theoretical | 24.60 | 2.75 | 72.64 | 293 |

1,1,1,6,6,6-hexachlorohexane was found to be useful as an intermediate for the preparation of adipic acid by acid hydrolysis, the reaction occurring probably as follows:

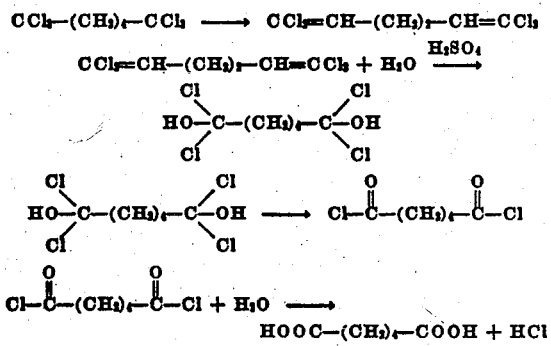

Because of its high chlorine content, 1,1,1,6,6,6-hexachlorohexane has excellent solvent power. It is useful as a plasticizer, as, for example, as a plasticizer for chlorinated resins.

Having thus described my invention it is to be understood that such description has been given by way of illustration and example only and not by way of limitation, reference for the latter purpose being had to the appended claims.

I claim:
1. 1,1,1,6,6,6-hexachlorohexane.
2. A process for the production of 1,1,1,6,6,6-hexachlorohexane comprising condensing 1,1,1,3-tetrachloropropane at a temperature between about 100° and 150° C. in the presence of water and a chlorine acceptor selected from the group consisting of iron, copper, and aluminum.
3. The process of claim 2 wherein the chlorine acceptor is iron.
4. The process of claim 2 wherein the chlorine acceptor is copper.
5. The process of claim 2 wherein the chlorine acceptor is aluminum.
6. A process for the production of 1,1,1,6,6,6-hexachlorohexane comprising condensing 1,1,1,3-tetrachloropropane at a temperature between about 100° and 150° C. in the presence of water and a chlorine acceptor selected from the group consisting of iron, copper, and aluminum, extracting the reaction mixture with a solvent for 1,1,1,6,6,6-hexachlorohexane, removing solvent from the resulting solution, and precipitating 1,1,1,6,6,6-hexachlorohexane from the residue.
7. The process of claim 6 wherein the chlorine acceptor is iron.
8. The process of claim 6 wherein the chlorine acceptor is copper.
9. The process of claim 6 wherein the chlorine acceptor is aluminum.

MARTIN B. NEUWORTH.

REFERENCES CITED

The following references are of record in the file of this patent:

UNITED STATES PATENTS

| Number | Name | Date |
|---|---|---|
| 1,800,371 | Bartlett | Apr. 14, 1931 |
| 2,416,717 | Shaw | Mar. 4, 1947 |

OTHER REFERENCES

Cohen, "Organic Chemistry," 4th edition, part I, page 215 (1923).